April 12, 1966  W. KENNEL  3,245,169
FOLDABLE FISHING ROD
Filed Sept. 18, 1964
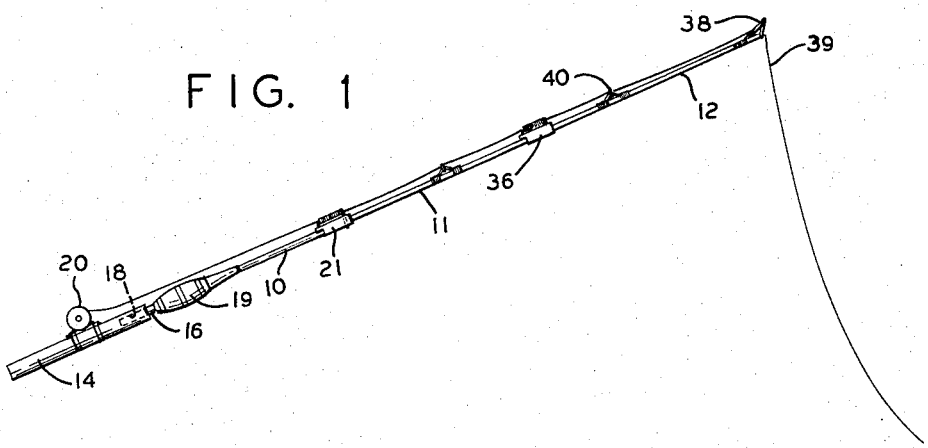
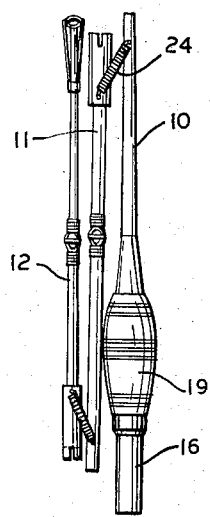
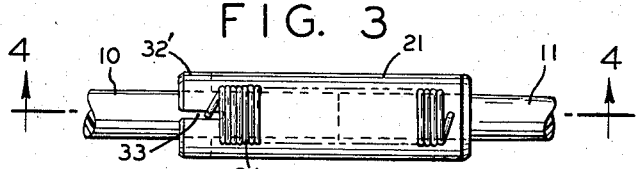
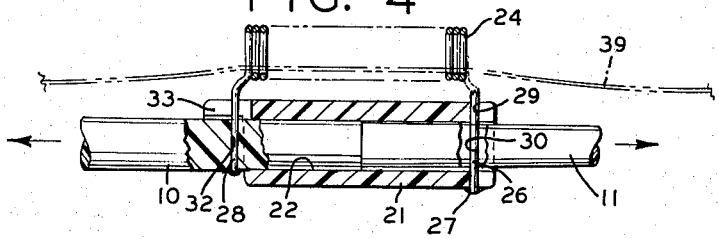
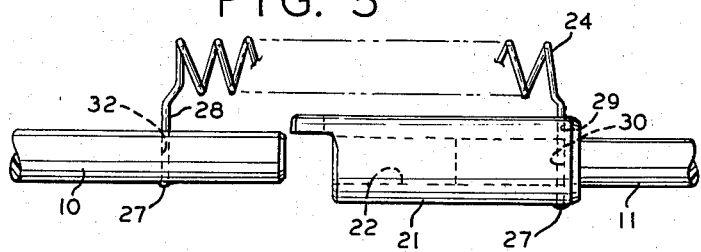
INVENTOR.
WILLIAM KENNEL
BY
JOHN P. CHANDLER
HIS ATTORNEY.

3,245,169
FOLDABLE FISHING ROD
William Kennel, 444 3rd Ave., New York, N.Y.
Filed Sept. 18, 1964, Ser. No. 397,751
5 Claims. (Cl. 43—18)

This invention relates to fishing poles and relates more particularly to a novel foldable pole designed primarily for salt-water fishing.

Lightweight bamboo or steel rods formed in sections are used in fresh-water fishing wherein the weight of the fish is generally less than in deep sea fishing and the bending stresses imposed on the rods are of lesser magnitude than in salt water rods which are generally made in one piece so as to reduce the chance of pole breakage.

More particularly a steel ferrule forming a connection between two sections of a pole will in all events have greater resistance to bending stresses than the pole sections themselves so it is inevitable that when playing a heavy salt water game fish the pole is likely to break either end of one of the ferrules.

It is an important object of the present invention to provide a sectional pole for heavy fishing in salt water and wherein the several sections are joined, when the pole is set up for use, by ferrules which have substantially the same resistance to bending stresses as the pole sections themselves and hence, in the case of a bending stress imposed on the pole beyond the elastic limits thereof, the pole sections and the interconnecting ferrules would stand an equal chance of breaking. Since, however, the pole sections are made from tough plastic materials of the same kind as one-piece poles are normally made from, this chance of breakage is exceedingly small.

Another object of the invention is to provide a novel hinge element connecting the ferrule with two adjoining pole sections so that all the sections are interconnected and can be detached and attached in axial alignment in a matter of seconds. This interconnection also completely eliminates the chance of sections being lost or mislaid. Foldable rods are not new, as shown by Patent No. 1,893,396 but this rod is far too expensive for ordinary use and it would be too heavy as well.

This hinge element which is a flexible, universal hinge, is a coiled spring having radially disposed terminals, one of which permanently secures the ferrule to one of the sections by passing through aligned holes in the ferrule and the pole but being capable of rotation within said holes. The other radial terminal passes through a transverse hole in the next adjacent section and also pivots therein. The end of the ferrule adjacent this latter radial terminal, prevents relative rotation between these pole sections.

During normal use of the pole for fishing, there are no tension stresses on the pole tending to pull, for example, section 10 out of sleeve 21. When, however, the pole is ready for folding, the tension of the spring is overcome as indicated in FIG. 5. It also serves a dual purpose in that it acts as a guide for the line.

A salt water fisherman will clearly appreciate the advantage of the present invention in that with, for example, three sections of 12 to 18 inches in length, and a separate handle section of the same length, the package is not only readily portable in a carrying case of comparable length, but the dedicated fisherman will carry three poles of varying weight and strength, all using the same handle section.

In the drawing:

FIG. 1 is a side elevation of a three section pole, complete with a reel carrying handle section embodying the present invention;

FIG. 2 is a side elevation of the three pole sections in folded relation and without the handle section;

FIG. 3 is an enlarged view showing two pole sections with interconnecting ferrules on the coiled spring in top plan view;

FIG. 4 is similar to FIG. 3 except that it is partially in section and shows the use of the coiled spring as a line guide;

FIG. 5 is an exploded view with the parts in the relation of FIG. 4.

The fishing pole chosen for illustration in the drawing has sections 10, 11 and 12, in addition to a handle or butt section 14 which may be used on various poles embodying the present invention. The first section 10 has at its inner end a male fitting 16 to be received in a socket 18 at the outer end of handle section 14, which latter may support a reel 20 in the usual fashion. A handle grip section 19 is disposed just forwardly of the male fitting 16.

The first section 10 and the second or intermediate section 11 are secured in axial alignment by means of a connecting sleeve or ferrule 21 which is formed of plastic material and of sufficient wall thickness to give it substantially the same resistance to bending action as the rod sections which are solid and may be made from fiberglass or even from the same material as the ferrules.

The ferrule is secured to one of the rod sections, e.g., to one end of section 11 and it has a bore 22 of a size to snugly fit sections 10 and 11. A helical or coiled spring 24 has radially extending terminal sections 26 and 28, section 26 passing through aligned holes 29 in a first end of the ferrule and 30 in the rod. This terminal section 26 secures rod section 11 in the ferrule and it may have some pivotal action in the holes as well. The ends of the radial terminal sections may be peened over as shown at 27. The other radial terminal section 28 of the spring passes through a hole 32 in section 10 of the rod and can be rotated therein. When the rod is assembled for use, the spring acts as a guide for the fishing line. When the section 10 is moved into the connecting ferrule, it should be pushed until it contacts the adjoining end of rod section 11. The two ends should be in substantially abutting relation if not actually touching. The rod can be dismantled by pulling rod section 10 longitudinally from the bore at the second end of the ferrule 21, against the tension of the spring, and the section 11 then rotated through an arc with radial terminal section 28 as a pivot. This second end of the ferrule has an extension 32' with a slot 33 to receive the radial terminal 28 of the spring and these prevent relative rotation between the two sections.

Outermost pole section 12 has a slightly smaller diameter than section 11 and the connecting ferrule 36 has a slightly smaller diameter. A tip 38 for the line 39 is secured at the outer end of the pole and if desired, each of sections 11 and 12 may have conventional line guides 40 as well.

It was earlier pointed out that radial terminal 28 should pivot on its hole 32 but that the other terminal 26 may, if desired, pivot in its holes 29–30. It will be noted from FIG. 2 that both terminals have rotated slightly from their initial position of FIG. 4.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A foldable fishing rod formed with a plurality of solid rod sections and a ferrule formed with first and second ends joining each pair of sections in substantially abutting relation, a coiled tension spring with radial terminals, one of which extends through the rod and ferrule at said first end, securing said rod and ferrule against displacement, the other radial terminal extending through the second rod section of the pair, at least one of said radial terminals being rotatable relative to the rod sections to permit folding action when the second rod section has been longitudinally displaced from the second end of the ferrule against the tension of said spring.

2. A foldable fishing rod formed with a plurality of rod sections and a ferrule formed with first and second ends joining each pair of sections in substantially abutting relation, said sections having radial holes adjacent their abutting ends and the ferrule having transverse, aligned holes in its first end aligned with the adjacent hole in the rod, a coiled tension spring with radial terminals, one of which extends through the rod and ferrule at said first end, securing said rod and ferrule against displacement, the other radial terminal extending through the hole in the second rod section of the pair, at least one of said radial terminals being rotatable within the holes in the rod sections to permit folding action, said second rod section being longitudinally displaceable from the second end of the ferrule against the tension of said spring.

3. A foldable fishing rod formed with a plurality of solid rod sections and a ferrule formed with first and second ends joining each pair of sections in substantially abutting relation, said sections having radial holes adjacent their abutting ends and the ferrule having transverse, aligned holes in its first end aligned with the adjacent hole in the rod, a coiled tension spring with radial terminals, one of which extends through the rod and ferrule at said first end, securing said rod and ferrule against displacement, the other radial terminal extending through the hole in the second rod section of the pair, at least one of said radial terminals being rotatable within the holes in the rod sections to allow pivotal movement of the spring when the rod is folded, said second rod section being longitudinally displaceable from the second end of the ferrule against the tension of said spring, said second end of the ferrule having a slot to receive said second radial terminal, said ferrule having substantially the same resistance to bending action as the rod sections.

4. A foldable fishing rod formed with a plurality of solid rod sections and a ferrule formed with first and second ends joining each pair of sections in abutting relation, one of said sections being permanently secured within the ferrule, a coiled tension spring with radial terminals, one of which extends through the rod at said first end, the other radial terminal extending through the second rod section of the pair, both of said radial terminals being rotatable relative to the rod sections to permit folding action when the second rod section has been longitudinally displaced from the second end of the ferrule against the tension of said spring.

5. A foldable fishing rod formed with a plurality of rod sections including a first section and a second section, and a ferrule formed with first and second ends receiving the adjoining ends of the rod sections and joining each pair of sections in substantially abutting relation, said sections having radial holes adjacent their abutting ends and the ferrule having transverse, aligned holes in its first end aligned with the adjacent hole in the rod, a coiled tension spring with radial terminals, one of which extends through the rod and ferrule at said first end, securing said rod and ferrule against displacement, the other radial terminal extending through the hole in the second rod section of the pair, said radial terminals being rotatable within the holes in the rod sections to permit each pair of sections to lie in side-by-side relation for folding, said second rod section being longitudinally displaceable from the second end of the ferrule against the tension of said spring, and a handle section receiving the inner end of the first section.

References Cited by the Examiner

UNITED STATES PATENTS

| | | | |
|---|---|---|---|
| 895,372 | 8/1908 | Hostetter et al. | 43—18 |
| 2,351,734 | 6/1944 | Backe | 43—18 |
| 2,365,414 | 12/1944 | Kruse | 43—18 |

ALDRICH F. MEDBERY, *Acting Primary Examiner.*

W. H. CAMP, *Assistant Examiner.*